Nov. 6, 1928.

R. W. BAILEY

1,690,265

DOOR CONTROL FOR AUTOMOTIVE BUSES

Filed Dec. 15, 1924

R. W. BAILEY 1,690,265

DOOR CONTROL FOR AUTOMOTIVE BUSES

Filed Dec. 15, 1924     5 Sheets-Sheet 5

Patented Nov. 6, 1928.

1,690,265

UNITED STATES PATENT OFFICE.

RUFUS W. BAILEY, OF KANSAS CITY, MISSOURI.

DOOR CONTROL FOR AUTOMOTIVE BUSSES.

Application filed December 15, 1924. Serial No. 755,901.

This invention relates to passenger vehicles, and with regard to certain more specific features, to motor coaches or busses for use on highways and/or metropolitan thoroughfares.

Among the several objects of the invention may be noted the provision of a motor coach equipped with exceedingly flexible door controls, operable under care of either one, two, or three men; a coach involving in its operation only one-way passenger traffic on its lower deck; a double decked coach with a door in the passage between decks; one which may be successfully operated as a one-, two- or three-man controlled coach as occasion demands; and one which is particularly safe in operation under all exigencies of heavy and fast traffic.

The invention accordingly comprises the features of construction, combinations of elements, and arrangements of parts which are exemplified in the structure hereinafter described, and the scope of the application of which will be indicated in the following claims.

In the accompanying drawings, in which is shown one of various possible embodiments of the invention.

Similar reference characters indicate corresponding parts throughout the several views of the drawings.

Deck arrangement.

Figure 1:
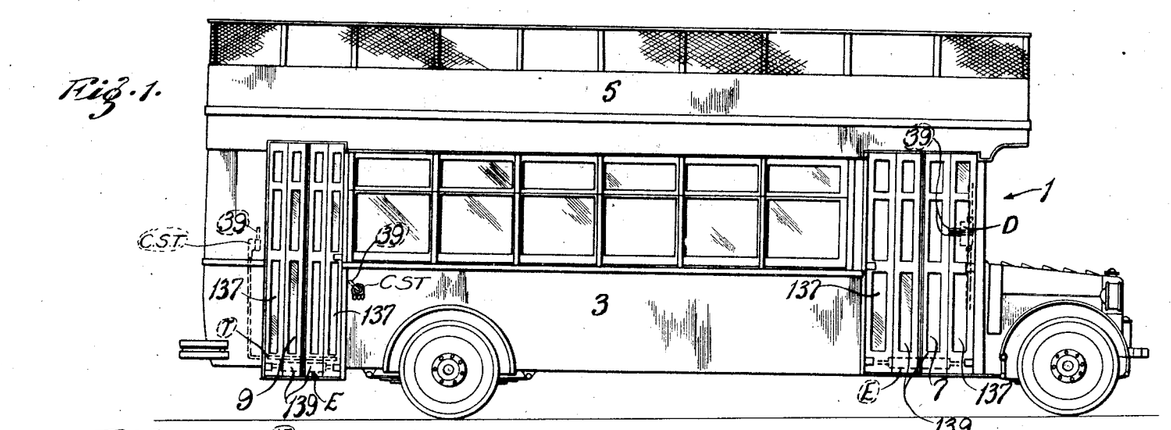
Fig. 1 is a side elevation of the motor coach.
Figure 2:
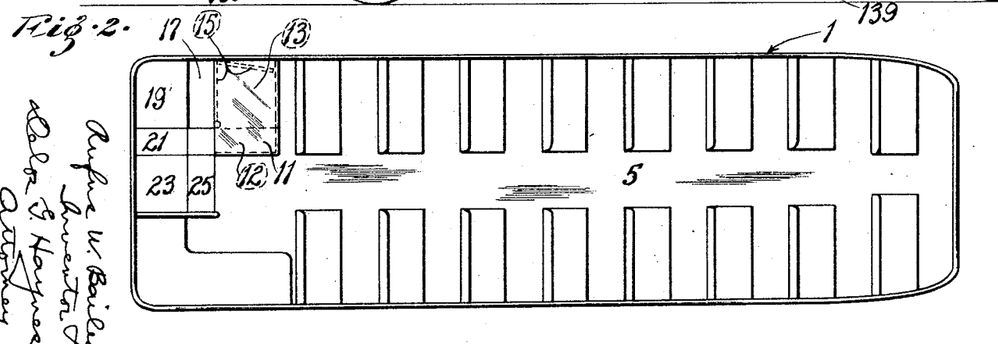
Fig. 2 is a plan view of the upper deck and stairway.
Figure 3:
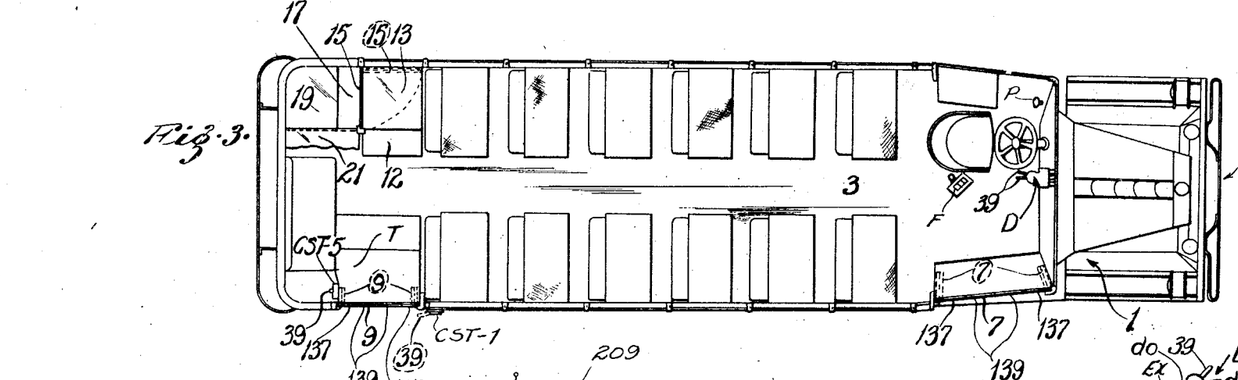
Fig. 3 is a plan of the lower deck.

Referring now more particularly to Figs. 1 to 3 there is illustrated at 1 a motor coach comprising an enclosed lower deck 3 and an open upper deck 5.

The lower deck 3 is provided forwardly thereof with a set of doors 7 to be used as an entrance to the coach. Rearwardly on said deck is provided a set of doors 9 to be used as an exit only, under normal conditions, but may be used as an entrance also, under such abnormal conditions as will be described hereinafter.

The sets of doors 7 and 9 are on the right side of the coach.

Figure 5:
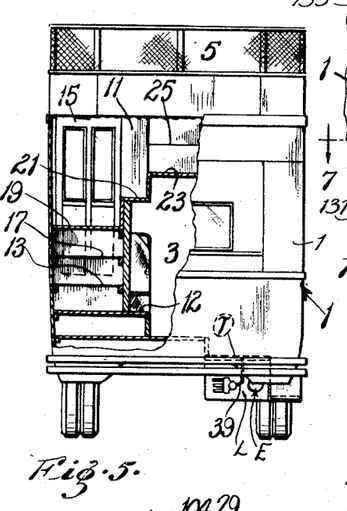
Fig. 5 is a rear elevation of the bus certain portions being broken away.

Opposite the rear doors 9 on the left side of the coach, (see Figs. 2, 3 and 5) is located a stairway leading from the closed lower to the open upper deck. This stairway comprises a penthouse 11 under which are located steps 12 and step-platform 13. Rearwardly in said penthouse 11 is placed a self closing door 15 swinging forwardly on a center near the left wall of the coach. Outside of the penthouse and rearwardly thereof is the step 17 leading upwardly and to the rear of the coach. The step 17 leads directly to another step-platform 19 in the left rear corner of the coach. The platform 19 serves to direct a passenger toward the right side of the coach and up on the step 21. From here a third step-platform 23 is reached which serves to direct a passenger toward the aisle of the upper deck. However another step 25 must be used to reach said aisle.

The ascent from the lower deck is made in eight steps as follows:

One, step 12;
Two, step-platform 13 (open door, turn left);
Three, step 17 (out of penthouse and lower deck);
Four, step-platform 19 (turn left);
Five, step 21;
Six, step-platform 23 (turn left to front of coach);
Seven, step 25;
Eight, upper deck 5 (to seat).

Thus a passenger passes expeditiously from the lower to the upper deck, the door 15 closing behind him. The door prevents stray air currents from entering the enclosed lower deck and the partially enclosed stairway outside of the penthouse serves to lend safe passage to a passenger when the coach accelerates or decelerates; as well as to prevent wind from entering the door 15 when it is open.

Passengers leave the upper deck by means of the stairs just described. It will be noted that there is no open rear platform on this coach.

Attention is called to the fact that under normal operating conditions all passengers enter the lower deck at the front doors 7, and in choosing a seat, pass rearwardly on the lower deck. Upon leaving, they pass rearwardly to the rear doors, thus obviating the necessity for any forward traffic in the aisle of the lower deck; that is, this is a one-way aisle. The advantages of such a condition are clear.

Figure 4:
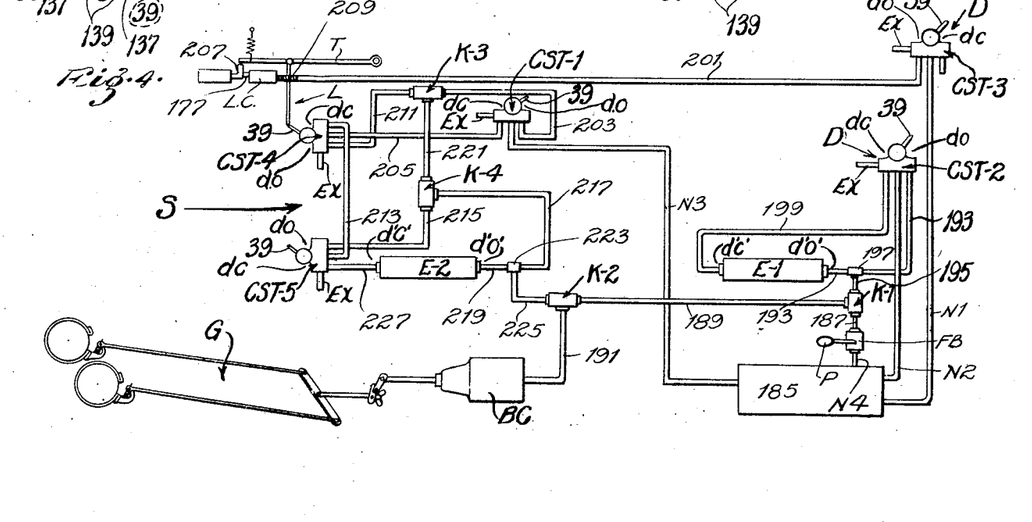
Fig. 4 is a schematic piping diagram for the pneumatic door and brake control system.

The doors 7 and 9 and the braking system of the coach are under control of the compressed air system S, illustrated in Fig. 4.

Control features.

The system S, may, without an adjustment, be put under control of one, two or three men, i. e., the chauffeur, or driver; the driver and a conductor or, the driver, a conductor and a street collector. In fact the whole coach may be operated with any of the combinations of men mentioned without altering said coach construction in the least.

The pneumatic system S involves several valve and door engine detail features which should be explained before the use of the system as a whole may be comprehended.

Valves.

Figure 10:
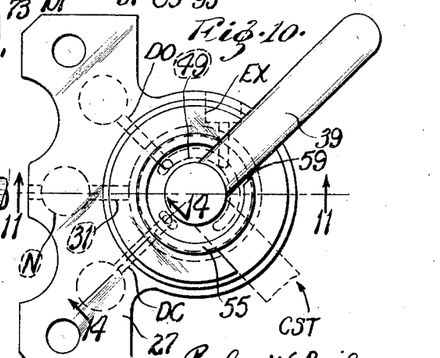
Fig. 10 is a top plan view of one of the operating or control valves.
Figures 11, 12, 13, 14, 15, 16, 17:
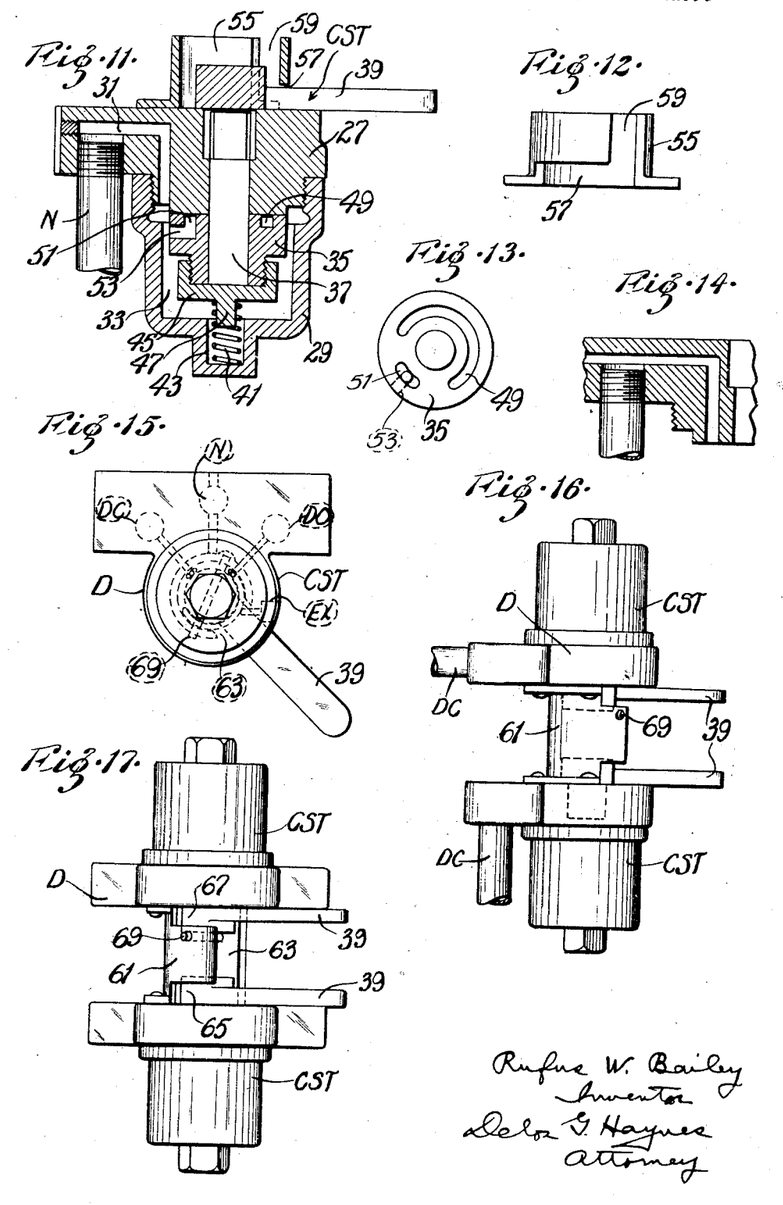
Fig. 11 is a vertical section taken on line 11—11 of Fig. 10.
Fig. 12 is a detail elevation of the handle safety-catch of the valve shown in Fig. 11.
Fig. 13 is a plan view of the rotatable valve proper, of the control valve shown in Fig. 11.
Fig. 14 is a fragmental sectional view of the control valve body, taken in line 14—14 of Fig. 10.
Fig. 15 is a top plan view of another control valve.
Fig. 16 is a left side elevation of Fig. 15.
Fig. 17 is a front elevation of Fig. 15.
Figure 20:
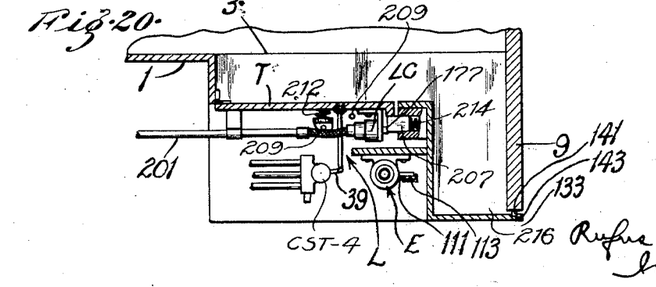
Fig. 20 is a fragmentary sectional view of the rear step showing the treadle releasing mechanism.

For the use of each conductor and street-collector, a valve CST is used (Figs. 10 and 11). This valve is used also in connection with a passenger release treadle to be described later. (Figs. 4 and 20.) This valve CST also forms the component parts of the driver's valve D. (Figs. 15, 16 and 17.)

Figure 8:
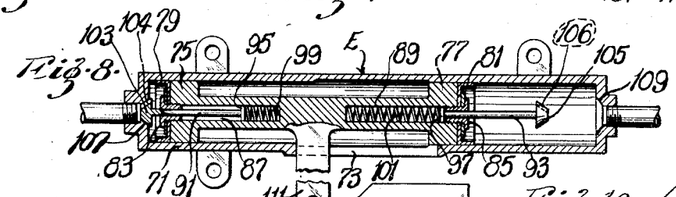
Fig. 8 is an enlarged sectional detail of a door-opening engine.
Figure 9:
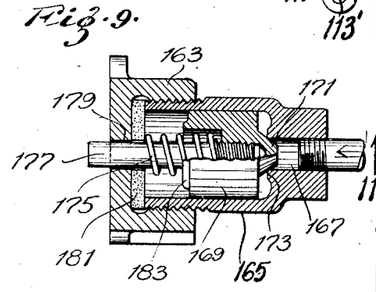
Fig. 9 is an enlarged sectional detail of the treadle-lock operating cylinder.

The system also comprises check valves K (Fig. 18), as well as door engines E (Fig. 8), and a lock operating cylinder, (Fig. 9).

Valve CST.

The valve CST, as illustrated in Figs. 10 and 11, comprises a body 27 with a lower chambered cup 29 screwed upwardly thereto. Pipe N brings air to the body portion 27 and cup 29. The bore 31 leads from the pipe N to a chamber 33 in cup 29. The chamber 33 contains a valve 35. This valve 35 has fitted thereto, the stem 37 whose flattened upper terminal receives a removable control lever 39. The valve 35 is kept seated against the body 27 by a coiled spring 41 which reacts at its lower end in a pocket 43 of the cup 29 and at its upper end against a cap 45 screwed to the valve 35. The cap 45 has cast centrally therewith a lug 47 for aligning the spring 41.

The valve 35 has an arcuate groove 49 cut in its upper face which serves to alternately join ports DC and DO of the body 27 with an exhaust port EX. Likewise a groove 51 met by the passage 53 serves to connect the pipe N through bore 31 alternately with said ports DC and DO. The handle 39 can be applied to the valve stem 37 only when the groove 49 connects the port DO with the port EX and consequently when the pipe N is in communication with the port DC. This is true, because of the crown-piece 55 fastened to the top of body 27, which, due to the lateral slot 57 permits oscillations of the lever 39, but because of the vertical slot 59, equal in width to the width of lever 39, will not permit taking off the handle 39, except at one position such as described.

The operation of the CST valve is as follows:

When the handle 39 is in the solid line position shown in Figs. 10 and 11 it may be applied to or taken from the valve stem 37 as permitted by the slot 59 of the crown piece 55. This corresponds to such a position of the valve ports as will put the supply pipe N in communication with port DC which corresponds to a door-closed position of one of the door engines. The door engine in question receives its supply through this valve. Meanwhile the portion of the engine which otherwise opens the doors is exhausting to port DO through groove 49 to atmosphere, through port EX.

If the handle 39 be set over to the dotted line position of Fig. 10 it may not be removed. This is its door-open position. Then supply pipe N feeds the port DO which leads to the door-opening side of the door engine. The engine then operates to open the doors and in the meantime its door-closing end exhausts to port DC through groove 49 to the atmosphere through port EX. The handle 39 can only be removed when the doors are shut thus obviating accidents due to operators leaving coach doors open when changing posts. Each operator carries a handle 39 so that unauthorized persons can not tamper with these valves.

Valve D.

The driver's valve D (see Figs. 15, 16 and 17) is a compound mechanism comprising two CST valves fastened together, one above the other, the upper one inverted and adjusted so that a door-open position of its handle 39 corresponds to the door-open position of the handle 39 of the valve beneath it. Here the crown piece 55 is replaced by a twin-crown piece 61 which at once serves as a coupling joining the two CST valves and as a safety piece, forcing the operator to leave the valve with a proper door-closed setting. The vertical slot 63 of the twin crown piece replaces the former slot 59 of the crown 55, and the horizontal slots 65 and 67 replace the slot 57. When the upper handle 39 is inserted in position a pin 69 is slipped into holes drilled laterally of the crown piece just below the lowermost surface of the handle 39. This pin 69 keeps the handle from dropping down although the handle may be oscillated for operation. In Fig. 16 the inlet pipe N for the upper valve CST is placed horizontally for purposes of convenient piping.

The object of compounding these valves into one is to bring handles 39 into close proximity in order that the operator may easily throw both with one movement of the hand, yet operate them selectively if occasion demands. In Fig. 4 the component CST valves of valve D are shown separately but have the features noted above. The valve D is operated by the driver only.

Door engines.

Figure 6:
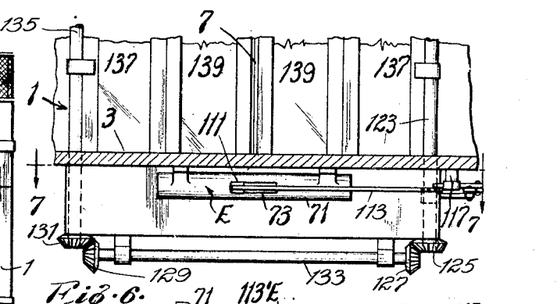
Fig. 6 is a detail in side elevation of the door opening linkage between the door opening engine and doors.
Figure 7:
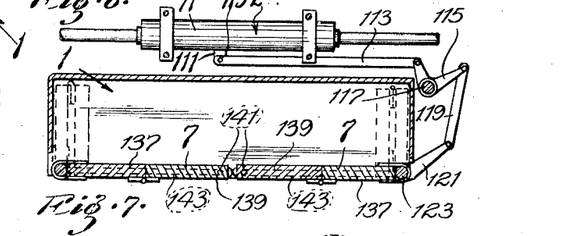
Fig. 7 is a horizontal section taken substantially on the line 7—7 of Fig. 6.

The door-opening engines E (Fig. 8) each comprise a cylinder 71 slotted at 73. Within the cylinder is a double headed piston operable to right and left. The heads 75 and 77 of this piston are provided with leather packing rings 79 and 81 held in place by washers and bored plugs 83 and 85. The plugs 83 and 85 are screwed into holes 87 and 89 bored longitudinally of the piston. The bored plugs serve as bearings for rods 91 and 93 put therethrough. The rods 91 and 93 are flared on their ends within the holes 87 and 89, and said flares 95 and 97 are backed by springs 99 and 101 set in the holes 87 and 89. These springs tend to hold the rods 91 and 93 outwardly from the holes. The rods 91 and 93 are provided with valves 103 and 105 at the rod ends opposite the flares. These valves are slotted at 104 and 106 respectively. The valves 103 and 105 are adapted to seat themselves in seats 107 and 109 at the ends of the cylinder 71. Centrally of the piston is provided an arm 111 extending laterally from said piston out through the slot 73 and adapted by means of a pin-hole 113' to operate the door opening linkage shown in Figs. 6 and 7.

The operation of the door engine proper is started from the, say door-closed position, shown in Fig. 8. Air is admitted through a pipe from the left. The valve 103 is forced from its seat and the piston with arm 111 is pushed toward the right as pressure builds up in the left end of the cylinder. In the meanwhile the charge of air which has been present in the right-hand end of the cylinder 71 is being forced out of pipe at the right end of the cylinder to an exhaust. This goes on at a rapid rate until the valve 105 seats itself. The valve 105 seats itself just before the doors close completely and, by partially trapping air in the right end of the cylinder, materially decelerates the closing of the doors. However the doors continue to close, inasmuch as air is permitted to slowly escape from the righthand end of cylinder 71 by means of the slot 106 in the valve 105. After or before the doors have been closed, the cycle of action within the cylinder 71 may be reversed by admitting air at the right and exhausting at the left. The transposition of the right-hand and left-hand pipes from exhaust to inlet pipes and vice versa is accomplished by means of the valves CST and D, the coordination of which will be described hereinafter.

Door linkage.

Figure 19:
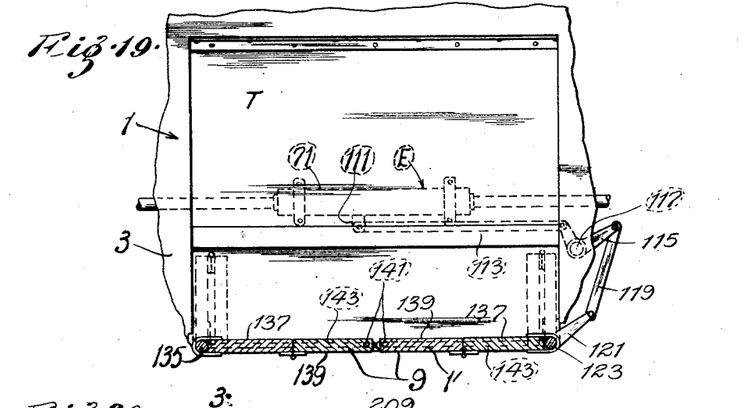
Fig. 19 is a horizontal section of a set of doors showing the linkage for opening them.

The door-opening linkage proper (for front door shown in Figs. 6 and 7 and for rear door in Fig. 19) comprises a link 113 reaching from an arm 111 to a bell-crank 115 rotatably mounted upon a vertical shaft 117. This bell-crank 115 cooperates through link 119 with a crank arm 121 fastened to a rotatable vertical shaft 123 to which one-half of a double folding door is attached. The shaft 123 is geared by means of bevels 125, 127, 129 and 131 and intermediate shaft 133 to the vertical shaft 135 on the opposite side of the door frame. The shaft 135 has fastened thereto the other half of the above mentioned double folding door. Each half of the door has a leaf 137 fastened to one of the vertical shafts and another leaf 139 hinged to said leaf 137. The leaves 139 are equipped with pins 141 extending downwardly into slots 143 in the flooring directly beneath the leaves.

As the door engine moves the shaft 111 (see Fig. 7) from left to right the door linkage moves so that cranks 115 and 121 rotate clockwise and likewise vertical shaft 123. The manner in which vertical shaft 135 is geared or linked to shaft 123 causes it to rotate in an opposite direction. The result of the motions of shafts 123 and 131 is that the leaves 137 are thrown inwardly while the leaves 139 hinge to such a position as shown in alternate dotted-line position due to pins 141 working in slots 143.

The door operating linkage so far described is operable for both front and rear doors.

Check valves.

Figure 18:
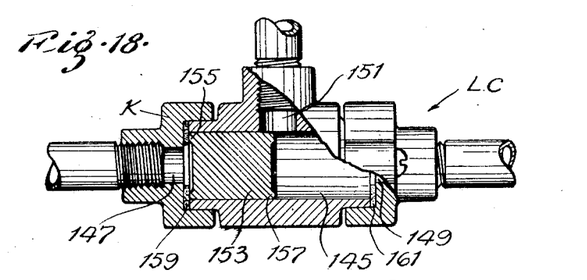
Fig. 18 is a fragmentary sectional view of a two-way check valve.

The check valves K are simple devices (Fig. 18). They comprise a cylinder 145 with pipe connections at both ends and one centrally thereof. Passages 147, 149 and 151 lead from these pipe connections to said cylinder. The latter passage 151 leads to the center of the cylinder 145 as shown. A free piston 153 is provided within the cylinder 145. The piston 153 is provided with lips 155 and 157 which seat on gaskets 159 and 161 respectively. The piston 153 is of such length that the central port 151 is open whenever the piston 153 is seated at either end of the cylinder. Thus, air entering the cylinder through either of the passages 147 or 149 forces the piston 153 to the opposite end of the cylinder where one of its lips cooperates with a gasket thus sealing that end of the cylinder 145, while the incoming air passes out through the open central port 151.

Lock cylinder.

The lock cylinder (Fig. 9) comprises a body 163 into which is screwed the threaded cylinder 165. The cylinder 165 receives air through the passage 167. A piston 169 is constrained to seat its tapered end 171 on the valve seat 173 of said inlet passage 167. The piston is caused to seat in this way by means of the spring 175 coiled about a pin 177 screwed longitudinally into said piston. The pin 177 extends out through a hole 179 in the body 163. A relatively soft gasket 181 interposed between the body 163 and cylinder 165 cooperates with a lip 183 of said piston to seal the air which enters the cylinder through passage 167. The air enters the passage 167 when the lock cylinder is to be operated. Such entering air throws the piston away from its seat, thrusts pin 177 outwardly and seats lip 183 on the rather soft gasket 181. Air is thus held within the cylinder. The spring returns the piston to its seat (at passage 167) when the air pressure to this device is released in a manner to be described later.

Pneumatic system.

Referring now to Fig. 4 in particular, the operation of the pneumatic system will be made clear. A supply tank 185 supplies compressed air to the system. There are four supply leads N1, N2, N3, N4, emanating from this tank 185.

Two leads N—1 and N—2 supply air to the system by way of the driver's valve D, said valve D being a compound of two similar valves CST—2 and CST—3 and operable with one movement (see Figs. 3 and 16). These valves CST—2 and CST—3 are of the CST type, as already explained.

Supply lead N3 supplies air to the system by way of the street collector's valve CST—1. The street collector's valve CST—1 is located on the outside of the coach in order that he may operate the rear doors 9 from the outside when it is imperative that fares be collected on the street and passengers admitted to the rear as well as the front doors. (See Figs. 3 and 4.)

The supply lead N4 supplies the brake cylinder BC by way of the valve FB. The valve FB is a conventional air valve operable by means of the foot pedal P at the will of the driver. Check valves K—1 and K—2 are in this line to the brake cylinder BC. This line includes pipes 187, 189 and 191.

One of the component valves CST—2 of the driver's valve D receives the supply lead N—2. From its door open position $d.\ o.$ a pipe 193 leads to the door-opening side $d'\ o'$ of the front door engine E—1. A branch pipe 195 leads from a T 197 in line 193 to the check valve K—1 of the brake cylinder line. From the door-closed position $d.\ c.$ of the driver's valve CST—2 a pipe 199 leads to the door closing side $d'\ c'$ of the front door engine E—1.

The valve CST—3 of the driver's valve D is supplied by the line N1. It is connected with the lock cylinder LC by pipe 201, part of which is flexible at 209.

The street collector's valve CST—1, fed by line N3 has a pipe 203 leading from its door-open side $d.\ o.$ to a check valve K—3. From its door-closed side $d.\ c.$ a line 205, acting as a supply line, leads air to a valve CST—4. This valve CST—4 is similar to all those of the CST type but has its operating handle linked up with a pivoted platform T or treadle operable (when freed by the action of the lock cylinder LC) under weight of a passenger leaving doors 9. This valve turns to its door open position $d.\ o.$ when a weight comes on T, that is a passenger, and the lock cylinder is operated to push out pin 177, thereby throwing the latch 207 (see Fig. 20) out of register with the treadle T. The treadle T under a passenger's weight then drops down to the stop 209 and in so doing throws the valve CST—4 to door-open position $d.\ o.$ A portion of the pipe 201 is flexible at 209. This operation comes to pass only when the driver's valve D permits air to pass to the lock cylinder L. C. so that the doors 9 may be opened at the will of the driver, only, when a passenger stands on treadle T. This last statement will be amplified later.

The valve CST—4 has pipe 211 leading from its door-open side $d.\ o.$ to the aforementioned valve K—3. A line 213 leads air from its door closed side *d. c.* to the valve CST—5, the latter of the general CST valve type. The valve CST—5 is the conductor's valve and under his control. From the door-open side *d. o.* of this CST—5 valve a line 215 leads to a check valve K—4. This check valve K—4 is connected with the door-opening side *d' o'* of the back door engine E—2 by means of pipes 217 and 219. The valve K—4 is also connected with the check valve K—3 by means of the pipe 221.

The line 217, 219 from the center of valve K—4 to the door-opening side *d' o'* of the back door engine E—2 branches at the T 223 and by means of pipe 225 communicates with the check valve K—2. This pipe 225 is always under pressure when pipe 217 is under pressure.

A line 227 leads from the door-closed side *d. c.* of the CST—5 valve to the door-closing side *d' c'* of the back door engine E—2.

In Fig. 4 the brake draft gear is shown conventionally at G and is operable under action of air passed to the brake cylinder B. C.

*One-man operation.*

If one man is to operate the coach the following possibilities of operation present themselves:

(*a*) A stop is made and passengers wish to enter.

In this case the driver uses the foot-brake pedal P to stop the coach and air goes from the tank 185, through pipe N—4, valve F. B. (now open), pipe 187, check valve K—1 to line 189, check valve K—2 to line 191, to brake cylinder B. C.; and the brakes are set. After the coach stops, he throws the handle of the valve CST—2 (this handle only if he is certain no one is leaving) to its door-open position *d. o.* Air then leaves the tank 185 through pipe N—2 to valve CST—2, pipe 193 and T 197 therein, to the door-opening side *d' o'* of the front door engine E—1, whereupon the front door opens. Some of this air also branches off at T 197, through pipe 195, check valve K—1 (if the driver has now released the brakes), pipe 189, check valve K—2, pipe 191 to the brake cylinder B. C. to hold the brakes set if the driver should have failed to do so. The passengers now enter, deposit their fare in the box F (Fig. 3) and proceed to their seats. The driver throws the handle of valve CST—2 to its door-closed position *d. c.* after all his passengers are aboard whereupon air is led from the tank through line N—2, and pipe 199 to the door closing side *d' c'* of the front door engine thus closing the front door. The air which went to the brake cylinder B. C. and door engine reverses its flow to the exhaust port of the valve CST—2, that port having been opened by throwing the valve to door-closed position (see description of CST valve).

Should the driver have inadvertently thrown the lever of the CST—3 valve also, (to its *d. o.* position) air would have gone through pipe N—1 to pipe 201 and thence to the lock cylinder LC, thereby throwing the plunger 207 out of register with the treadle T. No passenger being on the platform, the rear doors 9 would remain shut inasmuch as the treadle valve CST—4 would remain in door-closed position *d. c.* The spring 212 counter balances the weight of the treadle itself (see Fig. 20).

(*b*) Had a passenger desired to get off, he evidently would approach the rear door 9 after giving his signal. The treadle is at the rear door (see Figs. 1, 3 and 5) and thus the passenger would unconsciously step on the platform. The driver, having received his signal would have thrown his CST—3 valve lever to position *d. o.* This, as described, would make the treadle mechanism and the treadle valve CST—4 potentially operable and as the passenger's weight came on the treadle the treadle valve CST—4 would have been thrown to door-open position *d. o.* by means of linkage L. This would permit air to come from line N—3 through the *d. c.* side of the street collector's valve, CST—1, (these valves always in *d. c.* position when operator leaves; see CST valve description), then through feed line 205 to CST—4 valve (in *d. o.* position) through line 211 to check valve K—3, through line 221 to check valve K—4, then by means of pipe 217, T 223 and pipe 219 to the door-opening side *d' o'* of the rear door engine E—2.

The door-closing side *d' c'* of the engine exhausts through 227, CST—5, and 213 to the CST—4 exhaust. Incidentally some air would branch off at the T 223, through pipe 225, check valve K—2, and pipe 191 to the brake cylinder B. C. and so set the brakes, were they not already set.

After the passengers had descended the treadle would return to its upper position under action of the return spring 212, and the bolt 207 would re-register under the treadle because of the action of spring 214 (Fig. 20) that is, had the driver returned his CST—3 valve to door-closed position. A slight lag in the operation permits passengers to get clear of the doors before their closing. The space 216 over the rear step shown in Fig. 20 is not great enough for standing room so that the leaving passenger is forced to stop on the treadle T.

Should the driver fail to return his CST—3 valve handle to door-closed *d. c.* position, the rear door would close any way for the treadle valve would go to door-closed *d. c.* position thereby permitting air from the feed pipe 205 to enter the pipe 213 thence through the door-closed *d. c.* position of the conductor's valve CST—5, through pipe 227 to the door-closing side *d' c'* of the back door engine E—2. The brakes are released at this time, the air in the lines mentioned, namely, 191, 225, 217, 221, 211, reversing to exhaust at the treadle valve CST—4.

As soon as the driver returns the handle of the CST—3 valve to door closed position *d. c.*, air from the lock cylinder exhaust through pipe 201 to the CST—3 exhaust thereby preventing further opening of the rear door by means of a passenger's weight, that is, until the driver again so desires.

*Operation by driver and conductor.*

A conductor on the coach would bring to pass a new situation.

(c) Operation of rear door by conductor.

To open the rear door the conductor would not require the presence of a passenger on the treadle 8 inasmuch as the air entering his valve CST—5 comes from the supply pipes N—3 and 205 and thereby his valve draws air through the door-closed *d. c.* side of the valve CST—4. Thus if the treadle T is down the doors 7 open as already described. If it is up the treadle valve CST—4 is in door-closed position, which means that air passes through pipe 213 to the conductor's valve CST—5, whence he may throw it to either close or open the door. If he throws his valve to door-open position *d. o.* air from pipe 213 passes to pipe 215, through check valve K—4 to pipe 217, T 223, pipe 219 to the door-opening side *d' o'* of the back door engine. If he throws his valve to door-closed position *d. c.* air passes from pipe 213 to pipe 227, thence to the door-closing side *d' c'* of the rear door engine. As before the brakes would set when the door engine received air to open the door.

The conductor should not and cannot control the front doors 7.

*Operation by driver, conductor and street collector.*

If a street collector is used there exists another situation.

(d) Operation of the rear door by the street collector.

The street collector, inasmuch as he is leaving passengers in at the rear door, should not be dependent upon passengers leaving the coach for opening the rear door, nor on the conductor or driver.

Therefore should the street collector wish to open the door, he throws (by means of his insert lever) the outside valve CST—1 to its door-open position *d. o.* Thereby air comes from the supply, through pipe N—3 to valve CST—1, through this valve's *d. o.* position to pipe 203, thence to check valve K—3 to pipe 221, thence to check valve K—4 to pipe 217, T 223, pipe 219 to the door-opening side *d' o'* of the rear door engine E—2. This involves setting the brakes also as some air again branches down pipe 225 and follows a course already described.

After the street collector's duties have been performed he turns his CST—1 valve to door-closed position *d. c.* He must do this in order to remove his handle 39 which he should keep with him to use when the next coach arrives. When he sets the valve CST—1 to door-closed position *d. c.*, air backs up in the line previously traced to exhaust at the CST—1 valve thus relieving the brakes and the door-open side of the door engine. Simultaneously air from the supply line N—3 goes through the door-closed side *d. c.* of the valve CST—1 to pipe 205, and thence through the treadle valve and conductor's valve circuit in series (already traced) to the door-opening side *d' o'* of the back door engine E—2. Should either the treadle valve, CST—4 or the conductor's valve CST—5 be set for door-opening, the door-closing circuit will be blocked and the door remains open. That is, any one of the following: driver, conductor, street collector or treadle may have a valve set for open door and the doors remain open. This precludes the closing of doors on passengers by one operator when another has not as yet finished his duties with said passengers.

From the above the following is clear:

(1) Any door opening action (either front or rear) involves setting of the brakes, thereby making it safe to mount to, or alight from this coach. (See branch lines 195 and 225 of Fig. 4.)

(2) Only the driver is in control of the front door. (See CST—2 valve connections.)

(3) Operation of any of the valves, CST—1 (collector's) CST—3, (driver's) CST—4 (treadle), or CST—5 (conductor's) to door open position, *d. o.*, will serve to hold the rear door open. Hence passengers cannot be crushed by the inadvertent door closing operation of a valve by one operator before another is finished with his duties regarding said passengers.

(4) If no passenger is ready to alight from the rear door it will not open regardless of the setting of the driver's valve. This prevents unnecessary drafts within the coach. It will open however when the street collector or conductor set their valve for opening. The street collector is admitting people and can open the door regardless of the setting of the driver's, conductor's or treadle valve.

(5) A passenger wishing and ready to alight must wait until the doors are opened by a proper setting of the conductor's or driver's valve, that is, the passenger is a factor in the opening of the door but not a determining one. Passengers cannot let themselves off.

From the above it will be seen that the several objects of the invention are attained and other advantageous results achieved.

As many modifications of the embodiments above illustrated might be made without departing from the spirit or scope of the present invention, it is intended that the above description and accompanying drawings and claims shall be interpreted as illustrative and not in a limiting sense.

I claim:

1. An interlocking valve system in pneumatic control systems for motor coaches comprising means for closing certain doors, only at the will of all operators when three operators are used, and yet controllable by a single operator without change in structure.

2. An interlocking valve system in pneumatic control systems for motor coaches permitting the opening of certain doors by a driver but only after a specific positioning of a leaving passenger, when the only operator is the driver and permitting opening of said doors by a conductor independently of the passenger when a conductor and driver are used on the coach.

3. An interlocking valve system in pneumatic control systems for motor coaches permitting the opening of certain doors only after a specific positioning of a leaving passenger, said positioning of the passenger operating to set the brakes when said doors open.

4. An interlocking valve system in pneumatic control systems for motor coaches permitting the opening of certain doors only after a specific positioning of a leaving passenger, said passenger being without means for opening said doors without an opening action on the part of an only operator, the driver of the coach, said positioning of the passenger operating to set the brakes when the doors are open.

5. A pneumatically controlled door opening system for motor coaches, operable to open the rear door by an operator outside the coach when the door is shut irrespective of the positioning of passengers within the coach, and operable to open said door by one of two operators within the coach only upon a predetermined specific positioning of passengers within the coach.

6. A pneumatically controlled door opening system for motor coaches, operable to open the rear door by an operator outside the coach when the door is shut irrespective of the positioning of passengers within the coach, and operable to open said door by one of two operators within the coach only upon a predetermined specific positioning of passengers within the coach and operable by the other of said two operators independently of said specific positioning.

7. A pneumatically controlled door opening system for motor coaches, operable to open the rear door by an operator outside the coach when the door is shut irrespective of the positioning of passengers within the coach, a treadle adapted to operate a door operating valve upon release of a latch by the coach driver and the positioning of a passenger on the treadle, and another valve adapted to permit opening or closing of said door when the said valve operable by the treadle is in door closing position.

8. A pneumatically controlled door opening system for motor coaches, operable to open the rear door by an operator outside the coach when the door is shut irrespective of the positioning of passengers within the coach, a treadle adapted to operate a door operating valve upon release of a latch by the coach driver and the positioning of a passenger on the treadle, and another valve adapted to permit opening or closing of said door when the said valve operable by the treadle is in door closing position, and a last valve independently operable by the driver to control the opening and closing of the front door of the coach.

9. In a door control system for moving vehicles, a valve adapted to open a set of doors, means for setting this valve to opening position only when the vehicle has the brakes simultaneously applied thereto, a second valve connected with this valve adapted to receive air when said first valve is in its door closing position, a treadle cooperating with said second valve to open the valve when weight is applied to the treadle, said opening operating to open the said set of doors, a third valve connected with the second valve and adapted to open said doors when the second valve is in door closed position, and a treadle releasing and locking mechanism under the control of a driver.

10. In a door control system for moving vehicles, a valve adapted to open a set of doors, means for setting this valve to open position only when the vehicle has the brakes simultaneously applied thereto, a second valve connected with this valve adapted to receive air when said first valve is in its door closing position, a treadle cooperating with said second valve to open the valve when weight is applied to the treadle, said opening operating to open the said set of doors, a third valve connected with the second valve and adapted to open said doors when the second valve is in door closed position, a treadle releasing and locking mechanism under the control of a driver and an independent front door control under the control of said driver only.

In testimony whereof, I have signed my name to this specification this 11th day of December, 1924.

RUFUS W. BAILEY.